United States Patent

Han

(10) Patent No.: US 6,688,636 B2
(45) Date of Patent: Feb. 10, 2004

(54) LIGHT-PRODUCING STRUCTURE FOR WHEELED TRAVELING CASE ASSEMBLY

(76) Inventor: Angela W. Han, Fl. 7, No. 44, Lane 11, Kuang Fu North Road, Taipei (TW)

( * ) Notice: Subject to any disclaimer, the term of this patent is extended or adjusted under 35 U.S.C. 154(b) by 0 days.

(21) Appl. No.: 10/177,959

(22) Filed: Jun. 20, 2002

(65) Prior Publication Data

US 2003/0234515 A1 Dec. 25, 2003

(51) Int. Cl.[7] .............................. B62B 1/12; B60Q 1/26
(52) U.S. Cl. .................... 280/655; 280/655.1; 280/654; 280/47.17; 16/903; 301/5.301; 362/500; 362/193
(58) Field of Search .............................. 280/11.203, 37, 280/655, 655.1, 652, 654, 47.315, 47.17; 16/114.1, 405, 903; 301/5.301; 362/500, 485, 399, 193, 192

(56) References Cited

U.S. PATENT DOCUMENTS

| | | | | |
|---|---|---|---|---|
| 2,505,154 A | * | 4/1950 | Smith | 315/78 |
| 4,298,910 A | * | 11/1981 | Price | 362/35 |
| 4,363,502 A | * | 12/1982 | Bakerman | 280/816 |
| 4,848,009 A | * | 7/1989 | Rodgers | 36/137 |
| 5,303,485 A | * | 4/1994 | Goldston et al. | 36/137 |
| 5,456,478 A | * | 10/1995 | Hsu et al. | 280/11.203 |
| 5,477,435 A | * | 12/1995 | Rapisarda et al. | 362/189 |
| 5,513,080 A | * | 4/1996 | Magle et al. | 362/103 |
| 5,536,026 A | * | 7/1996 | Pozzobon et al. | 280/11.221 |
| 5,536,074 A | * | 7/1996 | Hsu et al. | 301/5.301 |
| 5,552,972 A | * | 9/1996 | Rezvani | 362/500 |
| 5,580,093 A | * | 12/1996 | Conway | 280/816 |
| 5,588,734 A | * | 12/1996 | Talamo et al. | 362/459 |
| 5,649,716 A | * | 7/1997 | Zhang | 280/11.19 |
| 5,676,451 A | * | 10/1997 | Tabanera | 362/156 |
| 5,683,164 A | * | 11/1997 | Chien | 362/500 |
| 5,718,499 A | * | 2/1998 | De Caro | 362/464 |
| 5,758,946 A | * | 6/1998 | Chen | 362/103 |
| 5,833,348 A | * | 11/1998 | Bailey, Jr. | 362/473 |
| 5,839,814 A | * | 11/1998 | Roberts | 362/545 |
| 5,873,600 A | * | 2/1999 | Conway | 280/816 |
| 6,135,621 A | * | 10/2000 | Bach et al. | 362/399 |
| 6,398,395 B1 | * | 6/2002 | Hyun | 362/500 |
| 6,530,581 B2 | * | 3/2003 | Lai | 280/11.203 |
| 6,553,629 B2 | * | 4/2003 | Grady et al. | 16/444 |
| 6,592,240 B2 | * | 7/2003 | Camarota et al. | 362/399 |

* cited by examiner

Primary Examiner—Brian L. Johnson
Assistant Examiner—J J Restifo
(74) Attorney, Agent, or Firm—W. Wayne Liauh

(57) ABSTRACT

A light-producing structure for a wheeled traveling case assembly includes a mini generator having a rotary shaft with a frictional wheel connected thereto to frictionally contact with an adjacent wheel of the assembly. When the wheel rotates, the frictional wheel and the rotary shaft are brought to rotate, enabling the mini generator to output currents, which are supplied to light-emitting elements provided on handle grip and traveling case of the assembly in order to give light. Each wheel of the assembly is internally provided with an induction coil and a plurality of small bulbs. A ring-shaped magnetic rotor is fixedly mounted on an axle of each wheel to locate in a central hole of the induction coil. When the wheel rotates, the induction coil rotates relative to the magnetic rotor to generate induced currents, which are supplied to the small bulbs in the wheel for the bulbs to give light.

8 Claims, 6 Drawing Sheets

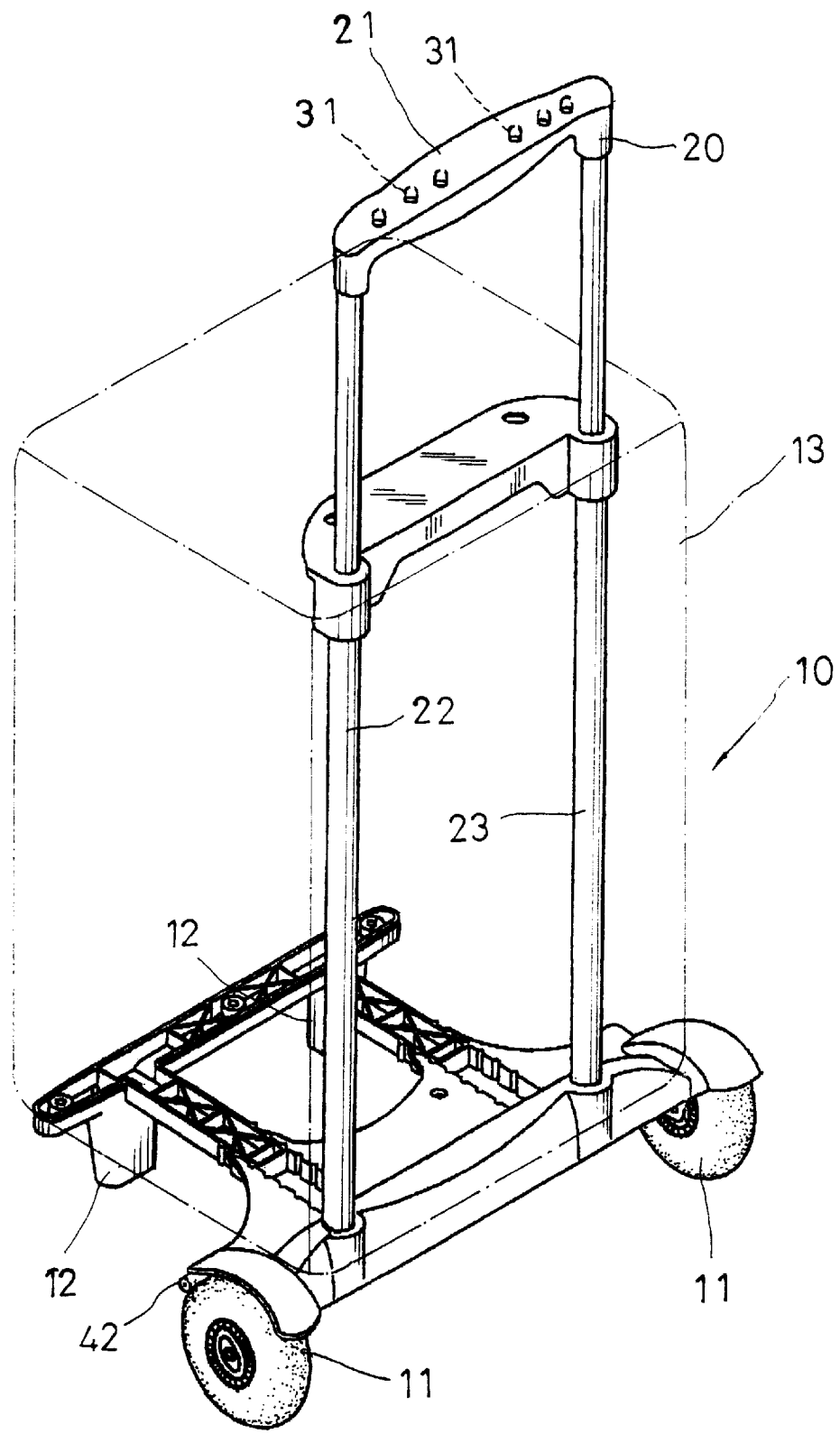
FIG·1

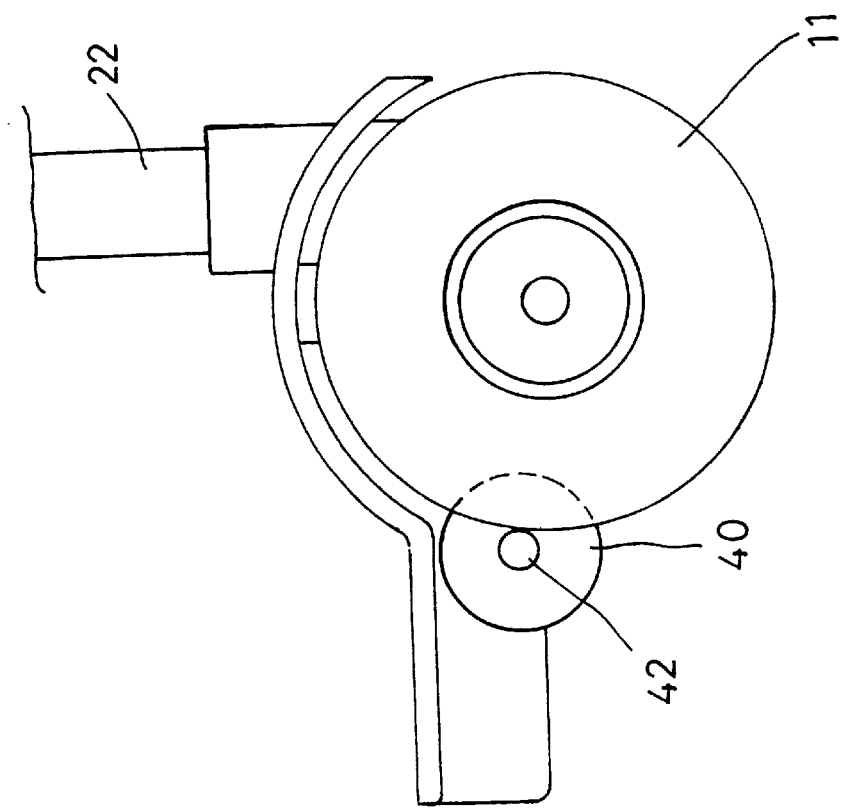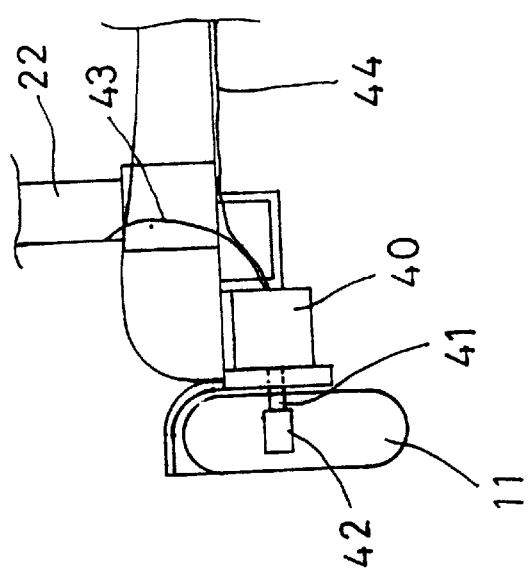

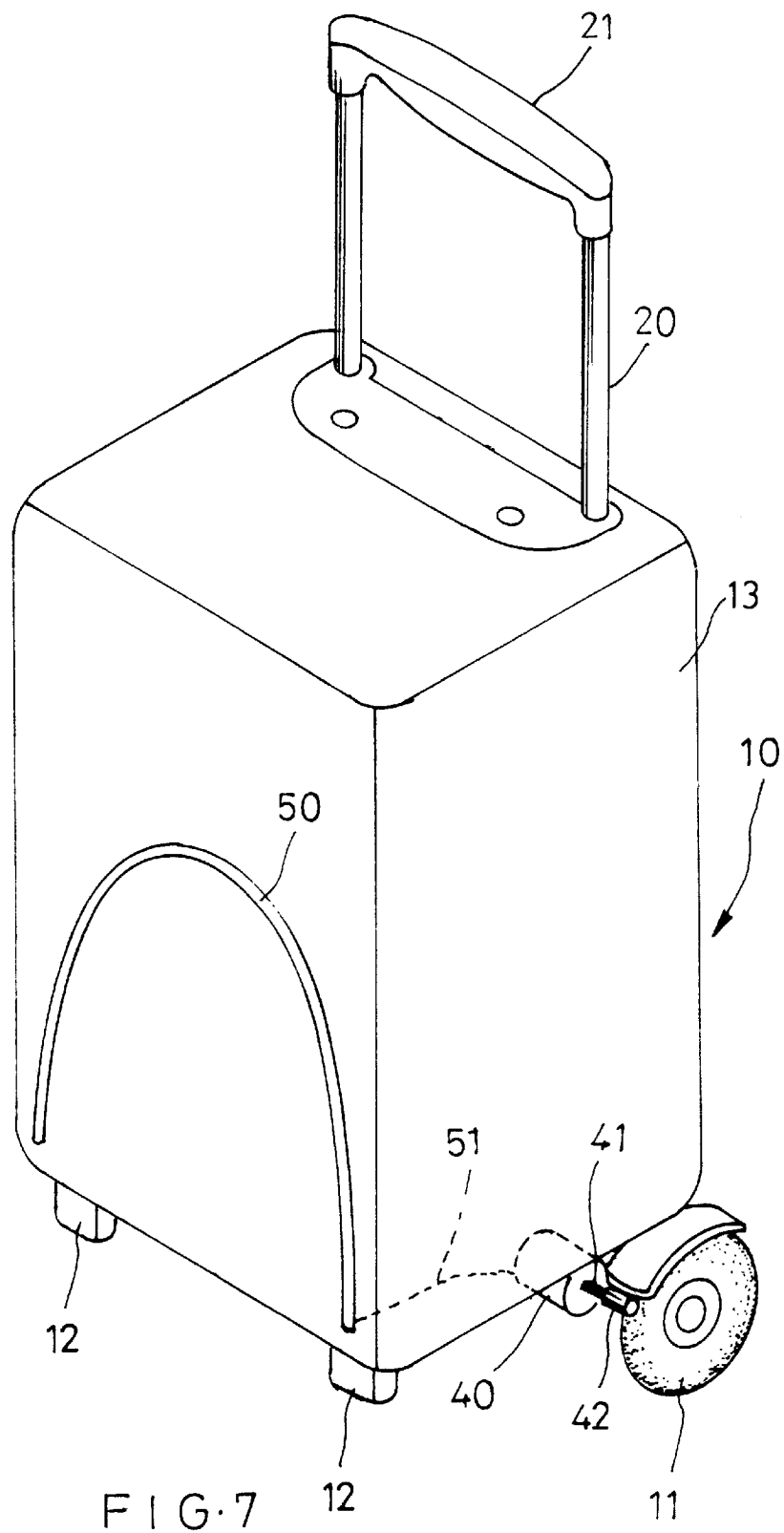
FIG·7

LIGHT-PRODUCING STRUCTURE FOR WHEELED TRAVELING CASE ASSEMBLY

BACKGROUND OF THE INVENTION

The present invention relates to a light-producing structure for wheeled traveling case assembly. When two wheels of the assembly rotate, a mini generator is caused to produce currents, which are supplied via conducting wires to light-emitting elements provided on wheels, handle grip, and traveling case of the assembly for the light-emitting elements to give light.

Consumers tend to select durable, multi-functional, and attractive products. Products meeting these conditions are particularly welcomed among children, teenagers, and adults who are still retaining child's innocence.

The design idea of wheeled traveling case assembly has also been employed in satchels. School children may now pull a wheeled satchel while walking easily without the need of laboriously carrying heavy books on backs.

The reduced visibility in the night prevents people from quickly perceiving objects within a short time. That is why most accidents occur in the night. However, people are sensitive to light in the dark. That is, people have the ability of quickly and clearly noticing a light source in the night. Since children are not aware of and do not respond to suddenly occurred dangers quickly, shoes with light emitting device are developed for children for them to wear and walk in the night safely. When a wearer walks, such shoes emit light as a warning to car drivers to avoid accidents. U.S. Pat. Nos. 4,848,009; 5,477,435; 5,303,485; and 5,758,946 all disclose shoes with light emitting device.

It is very frequent that a user pulls or pushes a wheeled traveling case assembly along or across a road in the night. The heavily loaded wheeled traveling case would usually distract the user when he or she crosses the road at inevitably slowed speed. An accident occurs if a car rushed by and did not notice someone is walking along or across the road.

SUMMARY OF THE INVENTION

It is a primary object of the present invention to provide a light-producing structure for wheeled traveling case assembly, so that currents are produced when wheels of the wheeled traveling case assembly rotate. The produced currents are supplied to light-emitting elements mounted on the wheels, handle grip, traveling case of the wheeled traveling case assembly for the light-emitting elements to give light. The wheeled traveling case assembly is therefore more attractive for use and helpful in ensuring the user's safety when he or she moves along or across a road in the night.

The light-producing structure for wheeled traveling case assembly of the present invention includes a mini generator provided near one wheel of the assembly. The mini generator includes a rotary shaft, an outer end of which has a frictional wheel connected thereto to frictionally contact with the adjacent wheel. When the wheel rotates, the frictional wheel and the rotary shaft are brought to rotate for the mini generator to output currents, which are supplied to light-emitting elements provided on handle grip and traveling case of the assembly for the light-emitting elements to give light.

The light-producing structure for wheeled traveling case assembly of the present invention also includes an induction coil and a plurality of small bulbs internally provided in each wheel of the assembly. A ring-shaped magnetic rotor is fixedly mounted on an axle of each wheel to locate in a central through hole of the induction coil. When the wheel rotates, the induction coil rotates relative to the magnetic rotor to produce induced currents, which are supplied to the small bulbs in the wheel for the bulbs to give light.

In the light-producing structure for wheeled traveling case assembly of the present invention, the light-emitting elements provided on the wheels, the handle grip, and the traveling case of the wheeled traveling case assembly are coated with a transparent waterproof material that does not hinder transmission of light emitted from the light-emitting elements.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 is a rear perspective view of a wheeled traveling case assembly incorporating a light-producing structure of the present invention;

FIG. 2 is a fragmentary plan view showing a position of a mini generator of the light-producing structure relative to a wheel of the wheeled traveling case assembly of FIG. 1;

FIG. 3 is a side view of FIG. 2;

FIG. 7 shows a luminescent element is provided on the wheeled traveling case assembly of FIG. 1.

DETAILED DESCRIPTION OF THE PREFERRED EMBODIMENTS

Figure 4:
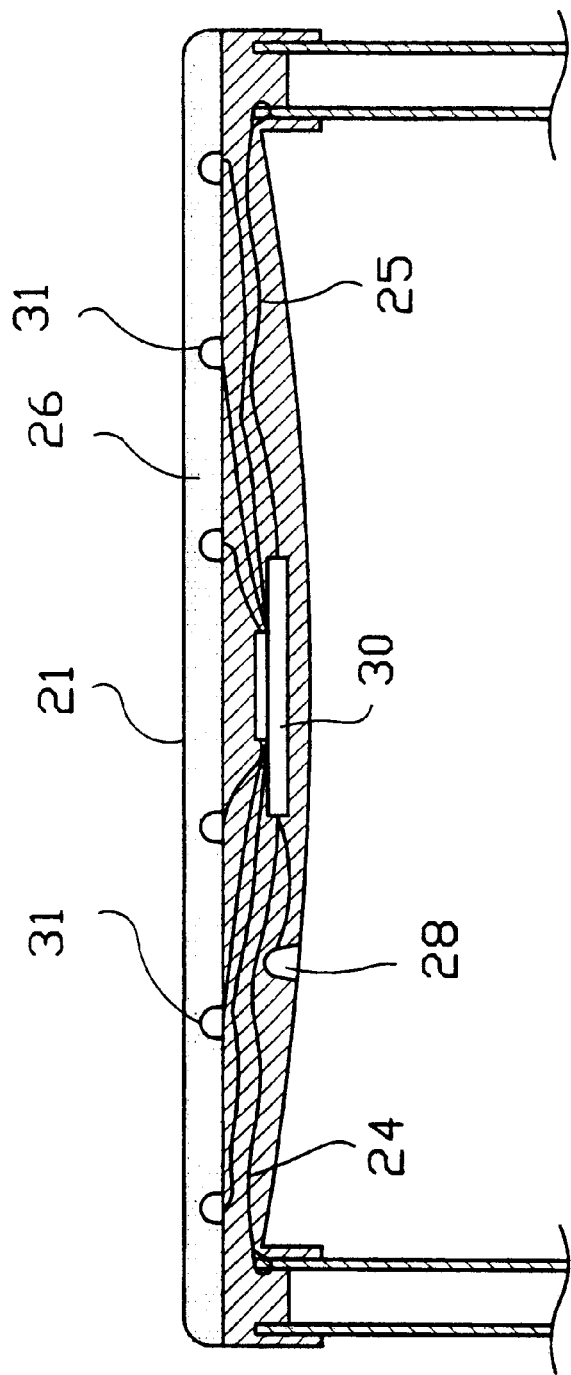
FIG. 4 is a fragmentary sectioned view showing a handle grip for the wheeled traveling case assembly of FIG. 1.

Please refer to FIG. 1 that is a rear perspective view of a wheeled traveling case assembly 10 incorporating a light-producing structure of the present invention. As shown, the wheeled traveling case assembly 10 mainly includes left and right wheels 11, an extendable pull handle 20 including two lower ends connected to the two wheels 11, two front supporting legs 12 forward extended from a lower front of the pull handle 20 to enable the wheeled traveling case assembly 10 to stand stably, and a traveling case 13 connected to the pull handle 20 and located above the two front supporting legs 12. The pull handle 20 includes left and right metal supporting bars 22 and 23, respectively, and a handle grip 21 transversely connected to upper ends of the two supporting bars 22, 23.

Please refer to FIGS. 1 to 5 at the same time. The light-producing structure of the present invention mainly includes a circuit board 30 and a plurality of small bulbs 31 internally provided in the handle grip 21 (see FIG. 4), a mini generator 40 provided near one lower outer end of the pull handle 20 and adjacent to one wheel 11, which is the left wheel in the illustrated drawings, and an induction coil 14, a circuit board 15, a plurality of small bulbs 16, and a ring-shaped magnetic rotor 17 mounted on each wheel 11.

As can be best seen in FIGS. 2 and 3, the mini generator 40 includes a rotary shaft 41, an outer end of which has a frictional wheel 42 connected thereto to frictionally contact with the adjacent wheel 11. While a positive and a negative conducting wire 43 and 44, respectively, of the mini generator 40 are separately connected to the left and right metal supporting bars 22, 23 of the pull handle 20, another two conducting wires 24, 25 are connected to the circuit board 30 in the handle grip 21, as shown in FIG. 4.

When the wheels 11 rotate, the frictional wheel 42 and accordingly, the rotary shaft 41 of the mini generator 40, to which the frictional wheel 42 is connected, are brought by the corresponding adjacent wheel 11 to rotate as a result of friction transmission, so that the mini generator 40 generates and outputs electric currents. The electric currents output from the mini generator 40 are supplied via the left and the right metal supporting bars 22, 23 of the pull handle 20 and the conducting wires 24, 25 to the small bulbs 31 in the handle grip 21 for the bulbs 31 to emit light.

Figure 5:
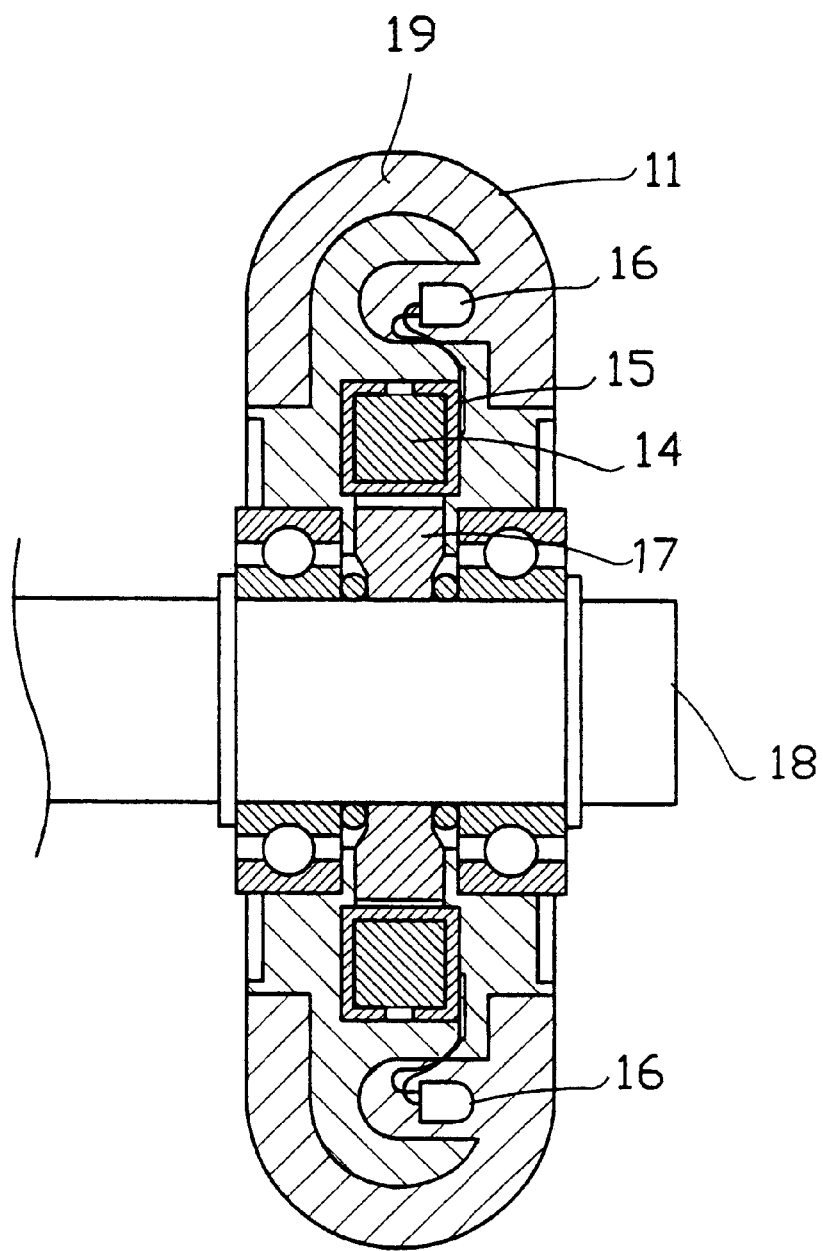
FIG. 5 is a sectional view of a wheel for the wheeled traveling case assembly of FIG. 1.

As can be best seen in FIG. 5, each of the left and the right wheels 11 has a central axle hole in which the ring-shaped magnetic rotor 17 is mounted to locate in a central through hole of the induction coil 14. The induction coil 14, the circuit board 15, and the small bulbs 16 on each wheel 11 are electrically connected to one another via conducting wires. The ring-shaped magnetic rotor 17 is firmly held by bearings and fixing members to an axle 18 of the wheel 11 to form an integral body with the axle 18. Thus, when the wheels 11 rotate, the induction coils 14 are brought to rotate at the same time relative to the ring-shaped magnetic rotors 17, causing the induction coils 14 to generate induced currents that are supplied to the small bulbs 16 for the latter to emit lights.

The wheeled traveling case assembly 10 equipped with wheels 11 is usually pulled forward with the wheels 11 rolling on a ground surface. Thus, the wheels 11 are actually two generators adapted to generate and supply currents to the small bulbs 16 thereon for the latter to emit light. On the other hand, currents needed by the small bulbs 31 on the handle grip 21 to emit light are output from the mini generator 40. Therefore, the small bulbs 16 and 31 on the wheels 11 and the handle grip 21, respectively, are able to emit light simply by pulling the wheeled traveling case assembly 10 in general manner of use without the need of any battery or other power source. The light-producing structure of the present invention for a wheeled traveling case assembly is therefore an economical and environmentally friendly design.

The wheels 11 have an outer tire 19 made of a material providing good light transmission, such as PU. The PU outer tires 19 protect the small bulbs 16 without adversely affecting transmission of light emitted by the bulbs 16. In addition, the PU outer tires 19 are excellently wear-resistant and have enhanced elasticity to enable a prolonged usable life of the wheels 11.

The handle grip 21 is coated with a waterproof transparent material 26 that protects the small bulbs 31 while allowing light emitted by the small bulbs 31 to pass therethrough. The circuit board 30 in the handle grip 21 may be provided with a chip to control the small bulbs 31 to emit light in different patterns. For example, the small bulbs 31 may be caused to flash simultaneously or alternately. Since such circuit design is a prior art, it is not discussed in details herein.

Figure 6:
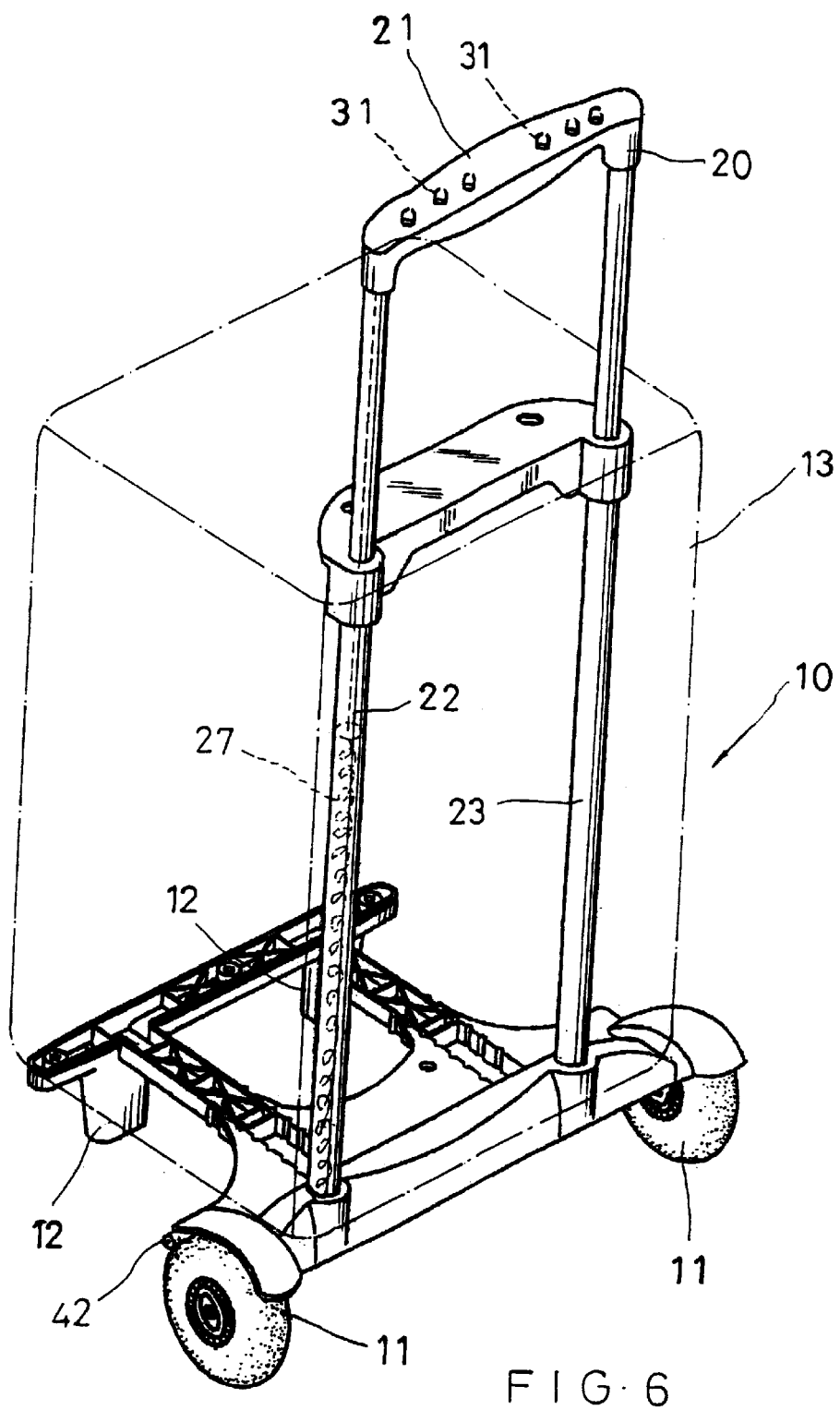
FIG. 6 shows conducting wires are provided in a pull handle of the wheeled traveling case assembly of FIG. 1.

Please refer to FIG. 6. The mini generator 40 and the circuit board 30 in the handle grip 21 may be otherwise connected via spiral wires 27 concealed in the supporting bar 22 of the pull handle 20. When the extendable pull handle 20 is extended or telescoped, the spiral wires 27 are adapted to stretch or compress correspondingly. As shown in FIG. 4, a speaker 28 may be provided on the handle grip 21 at a predetermined position to amplify music or other sounds when the speaker 28 is electrically made.

Other luminous element, such as a luminescent strip 50, may be provided on the traveling case 13 to electrically connect via a concealed conducting wire 51 to the mini generator 40 at one side of the wheel 11. When the wheels 11 rotate and the mini generator 40 outputs currents, the luminescent strip 50 on the traveling case 13 is supplied with power via the conducting wire 51 to emit light.

The light-producing structure of the present invention enables light to emit from the wheels, the handle grip, and the traveling case of a wheeled traveling case assembly when a user moves the latter in a most natural and general manner, making the wheeled traveling case assembly not only a highly interesting and attractive product, but also a product highly effective in helping the user to safely move along or across a road in the night.

What is claimed is:

1. A light-producing structure for a wheeled traveling case assembly including left and right wheels, an extendable pull handle including two lower outer ends connected to said left and right wheels two front supporting legs forward extended from a lower front of said pull handle to enable said wheeled traveling case assembly to stand stably, and a traveling case connected to said pull handle and located above said two front supporting legs, and said pull handle including left and right metal supporting bars and a handle grip transversely connected to upper ends of said two supporting bars, comprising:

a first circuit board and a plurality of light-emitting elements provided on said wheeled traveling case assembly and protectively coated with a waterproof material;

first conducting wires electrically connecting said first circuit board and said plurality of light-emitting elements;

a mini generator provided to one side of one of said two wheels, such that a frictional wheel mounted to an outer end of a rotary shaft of said mini generator frictionally contacts with one of said left and right wheels; and conductors and second conducting wires electrically connecting said mini generator to said first circuit board provided on said wheeled traveling case assembly;

wherein said conductors connecting said mini generator and said first circuit board are said left and right metal supporting bars of said pull handle.

2. The light-producing structure for a wheeled traveling case assembly as claimed in claim 1, wherein said waterproof material coating said light-emitting elements comprises a light transmissible material.

3. The light-producing structure for a wheeled traveling case assembly as claimed in claim 1, wherein said light-emitting elements are provided on said handle grip of said pull handle.

4. The light-producing structure for a wheeled traveling case assembly as claimed in claim 1, wherein said light-emitting elements are provided on an outer surface of said traveling case.

5. The light-producing structure for a wheeled traveling case assembly as claimed in claim 1, wherein said light-emitting elements comprise small bulbs.

6. The light-producing structure for a wheeled traveling case assembly as claimed in claim 1, wherein said light-emitting elements comprise one or more luminescent strips.

7. The light-producing structure for a wheeled traveling case assembly as claimed in claim 1, wherein said second conducting wires connecting said mini generator and said first circuit board are spiral wires.

8. The light-producing structure for a wheeled traveling case assembly as claimed in claim 1, further comprising an induction coil, a second circuit board, and a plurality of small bulbs internally provided in each of said left and right wheels, and a ring-shaped magnetic rotor fixedly mounted on an axle of each said wheel to locate in a central through hole of said induction coil; and said induction coil, said second circuit board, and said plurality of small bulbs being electrically connected with one another via third conducting wires.

* * * * *